(12) United States Patent
Shin et al.

(10) Patent No.: US 8,741,082 B2
(45) Date of Patent: Jun. 3, 2014

(54) METHOD OF MANUFACTURING AN ELECTROPHORETIC DISPLAY DEVICE

(75) Inventors: Sang Il Shin, Paju-si (KR); Kyoung-June Jung, Pocheon-si (KR)

(73) Assignee: LG Display Co., Ltd., Seoul (KR)

( * ) Notice: Subject to any disclaimer, the term of this patent is extended or adjusted under 35 U.S.C. 154(b) by 250 days.

(21) Appl. No.: 13/328,452

(22) Filed: Dec. 16, 2011

(65) Prior Publication Data

US 2013/0020014 A1    Jan. 24, 2013

(30) Foreign Application Priority Data

Jul. 18, 2011   (KR) ........................ 10-2011-0070788

(51) Int. Cl.
*B32B 37/12*   (2006.01)

(52) U.S. Cl.
USPC .......................................... 156/146; 359/296

(58) Field of Classification Search
CPC ....................................................... G02F 1/167
USPC ........................................... 156/146; 359/296
See application file for complete search history.

(56) References Cited

U.S. PATENT DOCUMENTS

| | | | |
|---|---|---|---|
| 6,950,226 B2 * | 9/2005 | Endo et al. | 359/296 |
| 7,411,719 B2 * | 8/2008 | Paolini et al. | 359/296 |
| 7,459,322 B2 * | 12/2008 | Ito et al. | 438/29 |
| 8,014,060 B2 * | 9/2011 | Hong et al. | 359/296 |
| 8,207,935 B2 * | 6/2012 | Abe et al. | 345/107 |

\* cited by examiner

*Primary Examiner* — Jeff Aftergut
(74) *Attorney, Agent, or Firm* — Morgan, Lewis & Bockius LLP

(57) ABSTRACT

The present disclosure relates to a method of manufacturing an electrophoretic display device, the method including the steps of forming a plurality of partition walls defining unipixel regions on a first substrate; filling an electrophoretic medium in the unipixel regions; forming an adhesive layer on a second substrate to bond the first substrate to the second substrate; forming (i) a plurality of adhesive portions for contact with the partition walls and (ii) a plurality of hardening portions for sealing the unipixel region filled with the electrophoretic medium by hardening a part of the adhesive layer; and bonding the first substrate and the second substrate to each other.

5 Claims, 8 Drawing Sheets

FIG.11
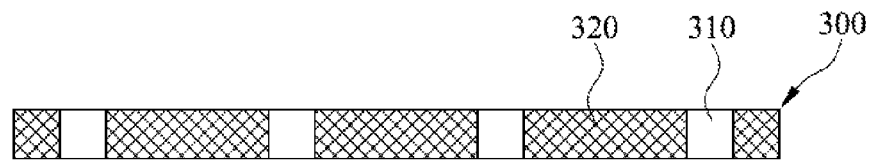
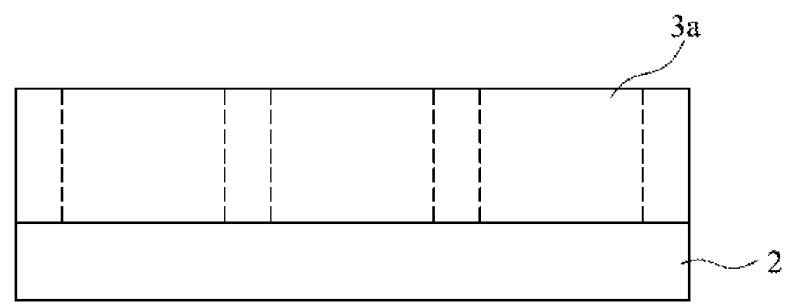
FIG.12
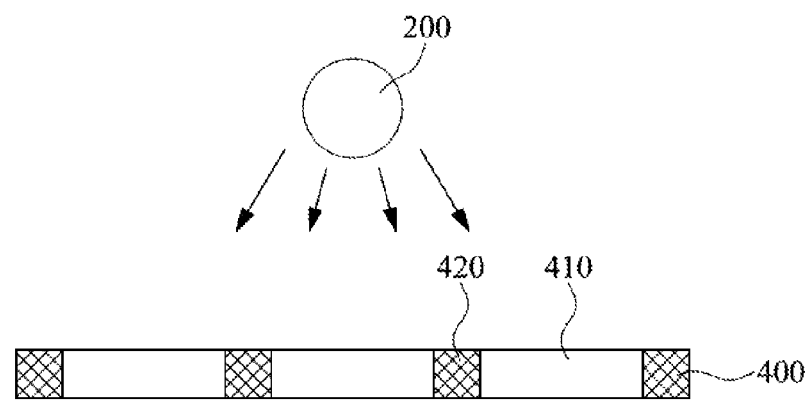
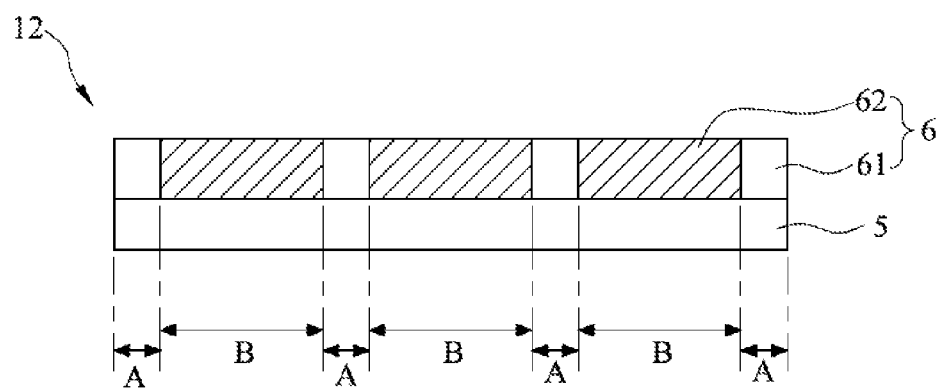

METHOD OF MANUFACTURING AN ELECTROPHORETIC DISPLAY DEVICE

CROSS REFERENCE TO RELATED APPLICATIONS

This application claims the benefit of the Korean Patent Application No. 10-2011-0070788 filed on Jul. 18, 2011, which is hereby incorporated by reference in its entirety.

BACKGROUND OF THE INVENTION

1. Field of the Invention

The present invention relates to an electrophoretic display device that displays images using electrophoresis.

2. Discussion of the Related Art

An electrophoretic display device (EPD) refers to a device that displays images using electrophoresis in which colored charged particles are moved by an external electric field. Since the electrophoretic display device has bistability, even though the applied voltage is removed, the original image can be maintained for a long time. In other words, the electrophoretic display device can maintain a certain picture screen for a long time even though a voltage is not continuously applied thereto. Accordingly, the electrophoretic display device is suitable for the field of e-book, which does not require quick switching of the screen. Also, the electrophoretic display device is advantageous in that it does not dependent upon a viewing angle unlike a liquid crystal display device and provides picture images comfortable to the eyes at a similar level to those of papers.

FIG. 1 is a brief view illustrating an electrophoretic display device according to the related art.

Referring to FIG. 1, the electrophoretic display device 100 according to the related art includes a first substrate 110 provided with a common electrode (not shown), a second substrate 120 provided with a thin film transistor (TFT) array (not shown), and an electrophoretic film 130 arranged between the first substrate 110 and the second substrate 120.

The electrophoretic film 130 includes a plurality of microcapsules 131. Each of the microcapsules 131 contains (i) a dielectric solvent 1311, (ii) black particles 1312 dispersed in the dielectric solvent 1311 and charged with positive, and (iii) white particles 1313 dispersed in the dielectric solvent 1311 and charged with negative. If an electric field is applied to the black particles 1312 and the white particles 1313, the black particles 1312 and the white particles 1313 are moved inside the dielectric solvent 1311 by Coulomb's force, whereby picture images are displayed.

The electrophoretic display device 100 according to the related art, however, has a problem in that the manufacturing cost is increased due to use of the expensive electrophoretic film 130. In this respect, a new electrophoretic display device that does not require such an electrophoretic film 130 would be beneficial.

SUMMARY OF THE INVENTION

The present invention is directed to a method of manufacturing an upper substrate of the electrophoretic display device and a method of manufacturing an electrophoretic display device, which substantially obviates one or more problems due to limitations and disadvantages of the related art.

One advantage of the present invention is to provide a method of manufacturing an upper substrate of the electrophoretic display device and a method of manufacturing an electrophoretic display device, in which the electrophoretic display device does not require an electrophoretic film having microcapsules.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these advantages and in accordance with the purpose of the invention, as embodied and broadly described herein, a method of manufacturing an electrophoretic display device may comprise the steps of forming a plurality of partition walls defining unipixel regions on a first substrate; filling an electrophoretic medium in the unipixel regions; forming an adhesive layer on a second substrate to bond the first substrate to the second substrate; forming (i) a plurality of adhesive portions for contact with the partition walls and (ii) a plurality of hardening portions for sealing the unipixel region filled with the electrophoretic medium by hardening a part of the adhesive layer; and bonding the first substrate and the second substrate to each other.

In another aspect of the present invention, a method of manufacturing an upper substrate for an electrophoretic display device comprises the steps of forming an adhesive layer on a base substrate; and forming a plurality of hardening portions for sealing an electrophoretic medium filled in a plurality of unipixel regions, defined by partition walls on a lower substrate, by hardening a part of the adhesive layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 to FIG. 13 are cross-sectional views illustrating an exemplary method of manufacturing an electrophoretic display device in accordance with additional embodiments of the present invention.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts. In the embodiment of the present invention, when some structure is formed "on" or "below" another structure, it should be understood that the disclosure includes that these structures are in contact with each other and that a third structure is interposed between the above structures.

Figure 1:
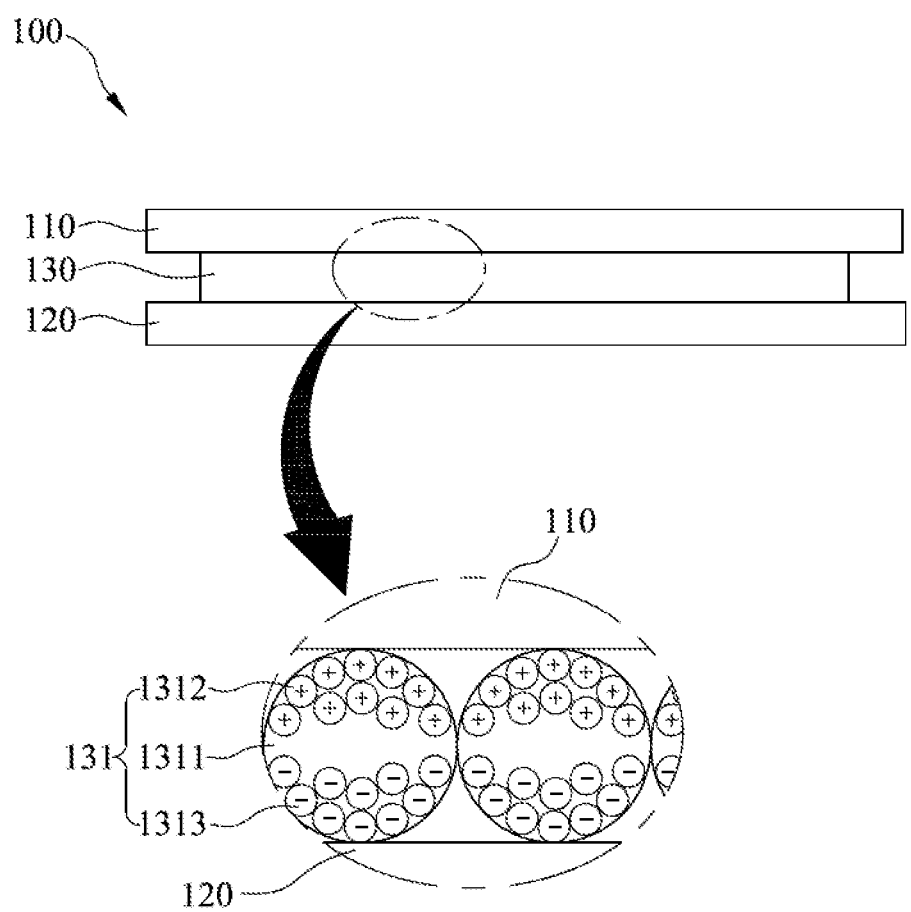
FIG. 1 is a brief diagram illustrating an electrophoretic display device according to the related art.
Figure 2:
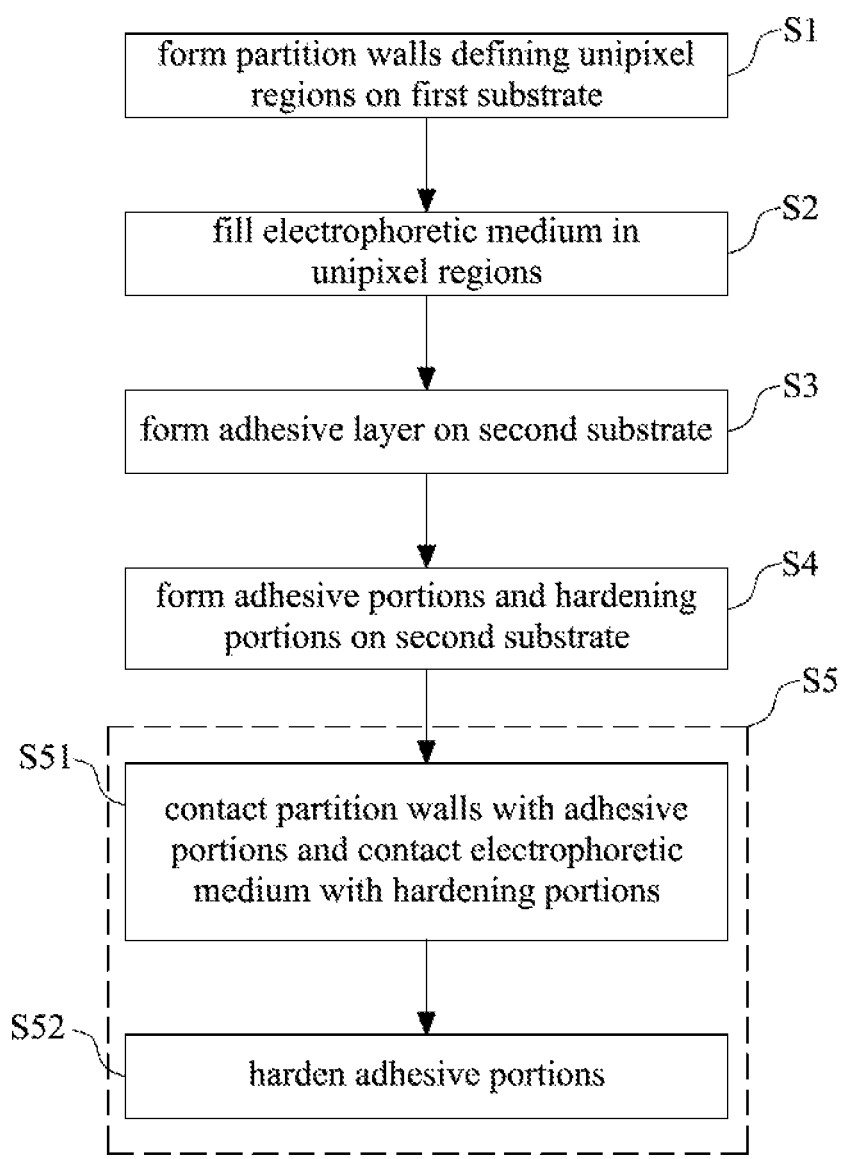
FIG. 2 is a flow chart illustrating an exemplary method of manufacturing an electrophoretic display device according to some embodiments of the present invention.

FIG. 2 is a flow chart illustrating an exemplary method of manufacturing an electrophoretic display device according to some embodiments of the present invention, and FIG. 3 to FIG. 13 are cross-sectional views illustrating an exemplary method of manufacturing an electrophoretic display device in accordance with additional embodiments of the present invention.

Referring to FIG. 2, in the method of manufacturing an electrophoretic display device, the electrophoretic display device internalized an electrophoretic medium may be manufactured without an electrophoretic film having microcapsules according to the related art. Accordingly, since the expensive electrophoretic film may be omitted, the manufacturing cost for manufacturing the electrophoretic display device may be reduced. The exemplary method of manufacturing an electrophoretic display device according to some embodiments of the present invention will be described as follows.

Figure 3:
Figure 4:
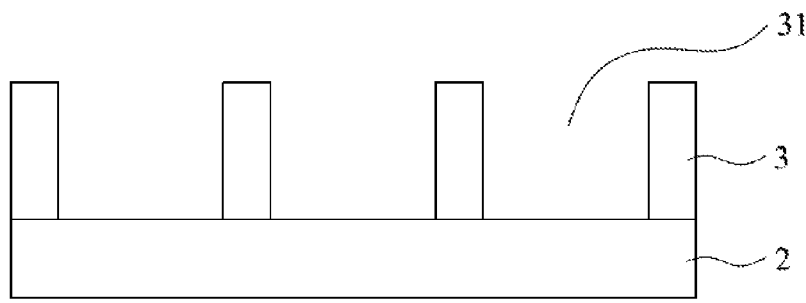

First of all, as shown in FIG. 2 to FIG. 4, a plurality of partition walls 3 are formed on a first substrate 2 (S1). In some embodiments, the partition wall may have the height of 100 µm or less, 60 µm or less, 40 µm or less, 20 µm or less, or 10 µm or less. In additional embodiments, the partition wall may have the width of 50 µm or less, 30 µm or less, 10 µm or less, 5 µm or less, or 2 µm or less. This process S1 may be performed in such a manner that after a partition walls layer 3a is formed on the first substrate 2 as shown in FIG. 3, the partition walls layer 3a is patterned as shown in FIG. 4. The partition walls layer 3a may be formed of an organic material. Patterning of the partition walls layer 3a may be performed by a photolithography process, an etching process, and the like. The partition walls 3 may be formed on the first substrate 2 in a latticed pattern through the above processes. As the partition walls 3 are formed on the first substrate 2, a plurality of unipixel regions 31 that can receive an electrophoretic medium 4 (shown in FIG. 5) are formed on the first substrate 2. As shown in FIG. 4, the unipixel regions are defined by the partition walls 3. In some embodiments, the size of the pixel region may be 10000 $\mu m^2$ or less, 5000 $\mu m^2$ or less, 1000 $\mu m^2$ or less, 500 $\mu m^2$ or less, 100 $\mu m^2$ or less, 80 $\mu m^2$ or less, 50 $\mu m^2$ or less, or 10 $\mu m^2$ or less. The process S1 of forming the partition walls 3 may include a process of forming a thin film transistor array on the first substrate 2. The partition walls 3 may be formed on the thin film transistor array. The thin film transistor array may be formed on the first substrate 2 so that a pixel electrode may be arranged in each of the partition walls 3. Examples of the first substrate 2 include, but are not limited to, a glass substrate, a metal substrate, and a plastic substrate.

Figure 5:
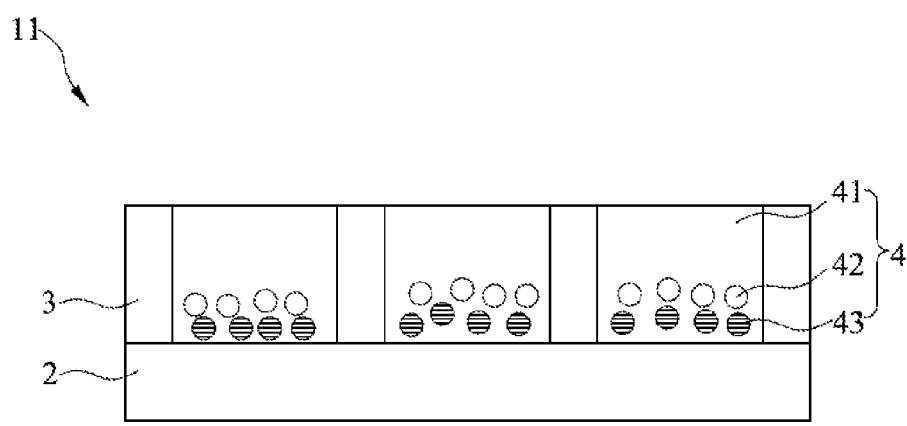

Next, as shown in FIG. 2 and FIG. 5, the unipixel regions defined by the partition walls 3 may be filled with the electrophoretic medium 4 (S2). This process S2 may be performed in such a manner that the unipixel regions 31 formed by the partition walls 3 are filled with the electrophoretic medium 4. The electrophoretic medium 4 may be filled in the unipixel regions 31 by any one of a die coating method, a casting method, a bar coating method, a slit coating method, a dispense method, a squeezing method, a screen printing method, and an inkjet printing method.

In some embodiments, the electrophoretic medium 4 includes a dielectric solvent 41, a plurality of first charged particles 42 dispersed in the dielectric solvent 41, and a plurality of second charged particles 43 dispersed in the dielectric solvent 41. If an electric field is applied to the first charged particles 42 and the second charged particles 43, the first and second charged particles 42 and 43 are moved inside the dielectric solvent 41 by Coulomb's, force, whereby picture images are displayed. The first charged particles 42 are charged to have a polarity opposite to that of the second charged particles 43. For example, if the first charged particles 42 are charged with negative (−), the second charged particles 43 may be charged with positive (+). The first charged particles 42 may be formed to have a color different from that of the second charged particles 43. Further, for example, if the first charged particles 42 have a white color, the second charged particles 43 may have a black color.

Although not shown, if the electrophoretic display device for displaying a color image is manufactured, the electrophoretic medium 4 filled in the plurality of unipixel regions 31 may be formed to constitute one pixel. In other words, the electrophoretic medium 4 filled in one unipixel region defined by the partition walls 3 may constitute one sub pixel. For example, if four sub pixels constitute one pixel, the sub pixels may be configured as follows. First of all, the electrophoretic medium 4 that includes first charged particles 42 having a first color and second charged particles 43 having a black color may be filled in a first unipixel region constituting a first sub pixel. Then, the electrophoretic medium 4 that includes the first charged particles 42 having a second color and second charged particles 43 having a black color may be filled in a second unipixel region constituting a second sub pixel. Next, the electrophoretic medium 4 that includes first charged particles 42 having a third color and second charged particles 43 having a black color may be filled in a third unipixel region constituting a third sub pixel. Subsequently, the electrophoretic medium 4 that includes first charged particles 42 having a fourth color and second charged particles 43 having a black color may be filled in a fourth unipixel region 3 constituting a fourth sub pixel. The first, second, third and fourth colors are selected from the group consisting of red, green, blue, white, or the group consisting of cyon, magenta, yellow, and white. In one aspect, the first, second third and fourth colors are red, green, blue, white. In another aspect, the first, second third and fourth colors are cyon, magenta, yellow, and white.

In additional embodiments, the number of the sub pixels can be varied. For example, if three sub pixels constitute one pixel, the electrophoretic medium 4 that includes first charged particles 42 having a first color and second charged particles 43 having a black color may be filled in a first unipixel region constituting a first sub pixel. Then, the electrophoretic medium 4 that includes the first charged particles 42 having a second color and second charged particles 43 having a black color may be filled in a second unipixel region constituting a second sub pixel. Next, the electrophoretic medium 4 that includes first charged particles 42 having a third color and second charged particles 43 having a black color may be filled in a third unipixel region constituting a third sub pixel. The first, second, and third colors are selected from the group consisting of red, green, and blue, or the group consisting of cyon, magenta, and yellow. In one aspect, the first, second third and fourth colors are red, green, and blue. In another aspect, the first, second third and fourth colors are cyon, magenta, and yellow.

In further embodiments, if the electrophoretic display device for displaying a black and white image is manufactured, the electrophoretic medium 4 that includes first charged particles 42 having a white color and second charged particles 43 having a black color may be filled in the unipixel regions.

In yet further embodiments, the ratio of the first charged particles 42 having a first color and the second charged particles 43 having a second color in each unipixel region can be varied. In one aspect, the ratio of the first charged particles 42 having a first color to the second charged particles 43 having a second color in each unipixel region may be 0.1, 0.5, 0.8, 1, 1.2, 5, or 10.

In some embodiments, the electrophoretic medium 4 that includes first charged particles 42 having a red color and second charged particles 43 having a black color may be filled in a first unipixel region defined by the partition walls 3 constituting a first sub pixel. Then, the electrophoretic medium 4 that includes the first charged particles 42 having a green color and second charged particles 43 having a black color may be filled in a second unipixel region defined by the partition walls 3 constituting a second sub pixel. Next, the electrophoretic medium 4 that includes first charged particles 42 having a blue color and second charged particles 43 having a black color may be filled in a third unipixel region defined by the partition walls 3 constituting a third sub pixel. Subsequently, the electrophoretic medium 4 that includes first charged particles 42 having a white color and second charged particles 43 having a black color may be filled in a fourth unipixel region defined by the partition walls 3 constituting a fourth sub pixel. Although not shown, the electrophoretic medium 4 may be configured to include a dielectric solvent 41 that includes a black dye, instead of the second charged particles 43 having a black color.

A lower substrate 11 (shown in FIG. 5) for the electrophoretic display device internalized the electrophoretic medium may be manufactured through the aforementioned processes. Hereinafter, the process of manufacturing an upper substrate in the method of manufacturing an electrophoretic display device according to the present invention will be described in more detail with reference to the accompanying drawings.

Figure 6:
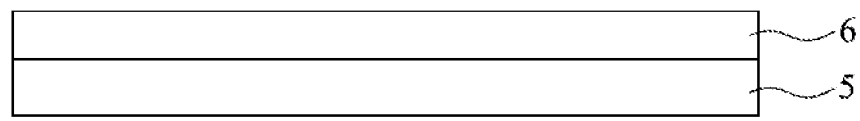

First of all, as shown in FIG. 2 and FIG. 6, an adhesive layer 6 is formed on a second substrate 5 (S3). This process S3 may be performed in such a manner that a sealant is deposited on the second substrate 5. The sealant may be deposited on the second substrate 5 in a liquid state. The sealant has adhesion before being hardened but does not have adhesion after being hardened. As the sealant is hardened, a structure in contact with the sealant is coupled with the sealant. A common electrode may be formed on the second substrate 5. The adhesive layer 6 may be formed on the common electrode. A base substrate formed of a transparent material may be used as the second substrate 5. The base substrate may be a glass substrate, a plastic substrate, and the like.

Figure 7:
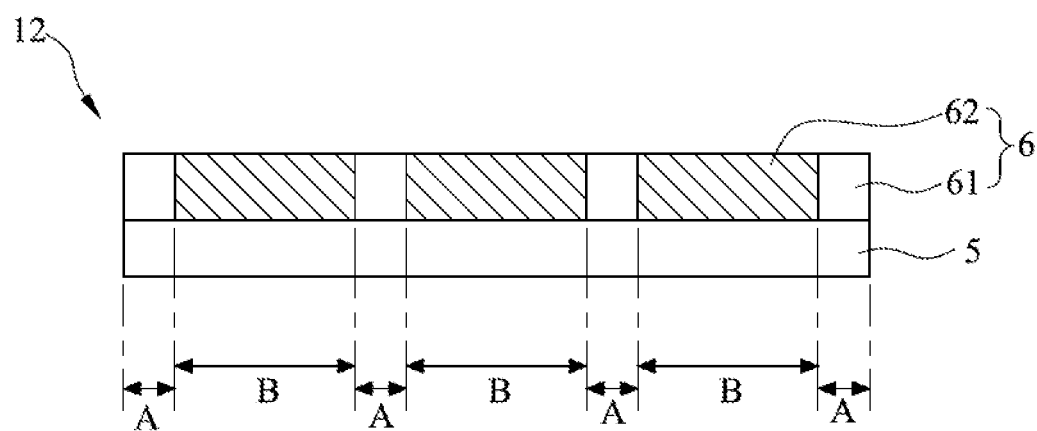
Figure 8:
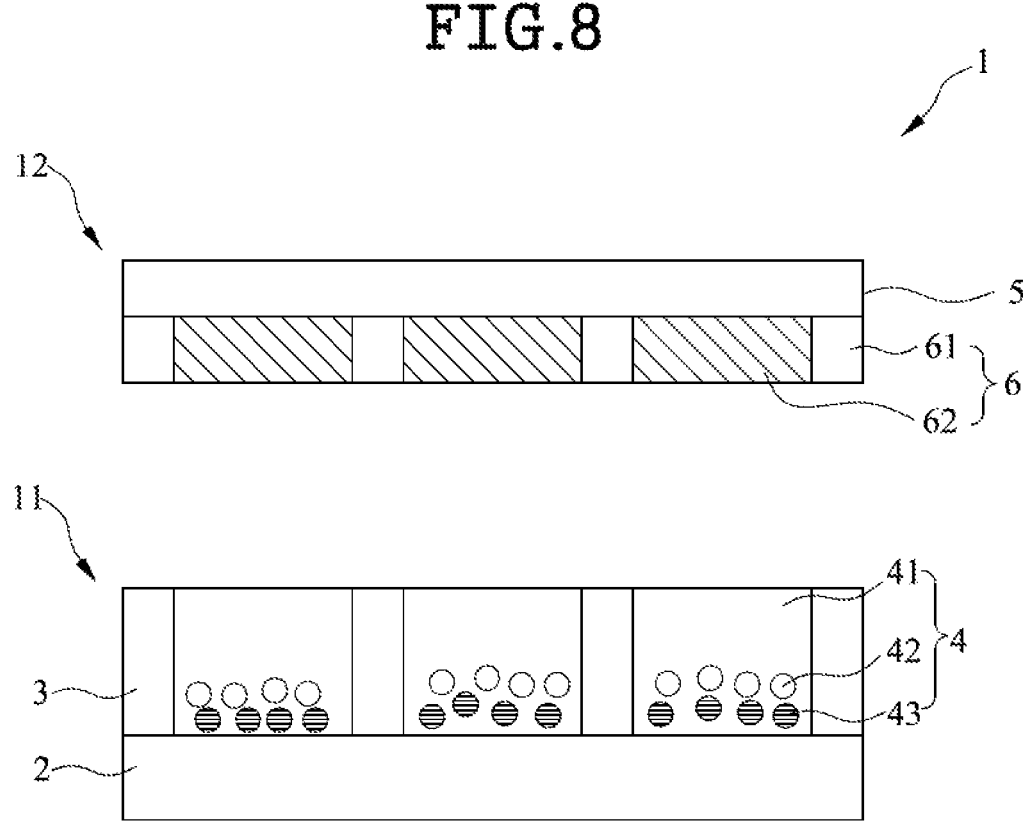

Next, as shown in FIG. 2, FIG. 7, and FIG. 8, a plurality of adhesive portions 61 and a plurality of hardening portions 62 are formed on the second substrate 5 (S4). This process S4 may be performed in such a manner that a part of the adhesive layer 6 is hardened.

First parts A (shown in FIG. 7) of the adhesive layer 6 are not hardened by the process S4. Accordingly, the first parts A of the adhesive layer 6 are formed as the adhesive portions 61. Since the adhesive portions 61 are not in a hardened state, they have adhesion. The adhesive portions 61 are in contact with the partition walls (shown in FIG. 8), which are formed on the first substrate 2 (shown in FIG. 8). The adhesive portions 61 are formed in a location and shape corresponding to the partition walls 3.

Second parts B (shown in FIG. 7) of the adhesive layer 6 are hardened by the process S4. Accordingly, the second parts B of the adhesive layer 6 are formed as the hardening portions 62. Since the hardening portions 62 are in a hardened state, they do not have adhesion. The hardening portions 62 seal the electrophoretic medium 4 (shown in FIG. 8), which is filled in a unipixel region 31 (shown in FIG. 4) defined by the partition walls 3. The hardening portions 62 are formed in a location and shape corresponding to the unipixel regions 31 (shown in FIG. 4) formed by the partition walls 3.

The process S4 of forming the adhesive portions 61 and the hardening portions 62 may be performed in such a manner that hardening light for hardening the sealant constituting the adhesive layer 6 is irradiated into the second parts B only. The hardening light may be ultraviolet (UV) rays or other light of different wavelength depending on the hardening materials used.

An upper substrate 12 (shown in FIG. 7) for the electrophoretic display device internalized the electrophoretic medium may be manufactured through the aforementioned processes. Hereinafter, in the exemplary method of manufacturing an electrophoretic display device according to some embodiments of the present invention, the processes of manufacturing the electrophoretic display device by bonding the lower substrate 11 (shown in FIG. 8) to the upper substrate 12 (shown in FIG. 8) will be described in detail with reference to the accompanying drawings.

As shown in FIG. 2, and FIG. 8 to FIG. 10, the first substrate 2 and the second substrate 5 are bonded to each other (S5). This process S5 may be performed in such a manner that at least one of the first substrate 2 and the second substrate 5 moves to be close to the other one. At least one of the first substrate 2 and the second substrate 5 may be moved by a bonding device. In the method of manufacturing an electrophoretic display device according to the present invention, since the first substrate 2 and the second substrate 5 are bonded to each other in a state that the hardening portions 62 are previously hardened, the electrophoretic display device 1 having improved quality can be manufactured. This will be described in more detail as follows.

First of all, if the first substrate 2 and the second substrate 5 are bonded to each other in a state that all parts of the adhesive layer 6 are not hardened, some of the electrophoretic medium 4 filled in the unipixel region defined by the partition walls 3 may be attached to the adhesive layer 6 due to adhesion of the adhesive layer 6. As a result, the electrophoretic medium 4 attached to the adhesive layer 6 does not work even though an electric field is applied thereto, whereby picture quality displayed by the electrophoretic display device 1 may be deteriorated.

Next, in the exemplary method of manufacturing an electrophoretic display device according to additional embodiments of the present invention, after the hardening portions 62 are formed by partially hardening the adhesive layer 6 in advance (S4), the first substrate 2 and the second substrate 5 are bonded to each other (S5). In this case, since the hardening portions 62 do not have adhesion when the first substrate 2 and the second substrate 5 are bonded to each other, the electrophoretic medium 4 filled in the unipixel region defined by the partition walls 3 may be prevented from being attached to the hardening portions 62. Accordingly, in the method of manufacturing an electrophoretic display device according to the present invention, picture quality of the electrophoretic display device 1 can be improved and the electrophoretic display device 1 having improved quality can be manufactured.

The electrophoretic display device internalized the electrophoretic medium may be manufactured through the aforementioned processes. Hereinafter, further embodiments of the processes will be described in more detail with reference to the accompanying drawings.

Referring to FIG. 2, FIG. 8 to FIG. 10, the process S5 of bonding the first substrate 2 and the second substrate 5 to each other may further include the following processes.

First of all, the partition walls 3 may be in contact with the adhesive portions 61, and the electrophoretic medium 4 filled in the unipixel region defined by the partition walls 3 is in contact with the hardening portions 62 (S51). This process S51 may be performed in such a manner that at least one of the first substrate 2 and the second substrate 5 moves. Since the hardening portions 62 are in a hardened state, they do not have adhesion. Accordingly, the electrophoretic medium 4 filled in the unipixel region defined by the partition walls 3 is not attached to the hardening portions 62 even though it is in contact with the hardening portions 62. Therefore, in the method of manufacturing an electrophoretic display device according to the present invention, since the electrophoretic medium 4 can fully be filled in the unipixel region defined by the partition walls 3, the electrophoretic display device 1 having improved quality can be manufactured. This will be described in more detail as follows.

If all parts of the adhesive layer 6 is not hardened, the electrophoretic medium 4 may partially be filled in the unipixel region defined by the partition walls 3 so that the electrophoretic medium 4 is not in contact with the adhesive layer 6 when the first substrate 2 and the second substrate 5 are bonded to each other. Namely, the dielectric solvent 41 may be filled to be lower than the height of the partition walls 3. In this case, as compared with that the electrophoretic medium 4 is fully filled to the height of the partition walls 3, the first charged particles 41 and the second charged particles 42 move to only a location spaced apart from a display area 1a (shown in FIG. 10) of the electrophoretic display device 1 at a long distance, whereby picture quality displayed by the electrophoretic display device 1 may be deteriorated.

In another exemplary method of manufacturing an electrophoretic display device according to some embodiments the present invention, even though the electrophoretic medium 4 filled in the unipixel region defined by the partition walls 3 is in contact with the hardening portions 62, it is not attached to the hardening portions 62, whereby the electrophoretic medium 4 may fully be filled in the unipixel region defined by the partition walls 3. Accordingly, as compared with an example where the electrophoretic medium 4 is partially filled in the unipixel region defined by the partition walls 3, in the method described herein, since the first charged particles 41 and the second charged particles 42 move to a location spaced apart from a display area 1a (shown in FIG. 10) of the electrophoretic display device 1 at a short distance, whereby picture quality displayed by the electrophoretic display device 1 may be improved.

Next, the adhesive portions 61 are hardened to bond the first substrate 2 and the second substrate 5 to each other (S52). This process S52 may be performed in such a manner that hardening light for hardening a sealant constituting the adhesive portions 61 is irradiated into the adhesive portions 61. The hardening light may be ultraviolet (UV) rays or other light of different wavelength depending on the hardening materials used. As described above, as the sealant is hardened, a structure in contact with the sealant is coupled with the sealant, whereby the adhesive portions 61 are coupled with the partition walls 3 while being hardened. As a result, the first substrate 2 and the second substrate 5 can tightly be bonded to each other.

Referring to FIG. 2 and FIG. 8, the process S5 of bonding the first substrate 2 and the second substrate 5 to each other may further include a process of aligning the positions of the first substrate 2 and the second substrate 5. This process may be performed in such a manner that at least one of the first substrate 2 and the second substrate 5 moves in a state that the second substrate 5 is arranged above the first substrate 2 as shown in FIG. 8. The process of aligning the positions of the first substrate 2 and the second substrate 5 may be performed in such a manner that the partition walls 3 are aligned to correspond to the adhesive portions 61. In this case, the adhesive portions 61 are arranged above the partition walls 3, and the hardening portions 62 are arranged above the electrophoretic medium 4 filled in the unipixel region defined by the partition walls 3. Although not shown, each of the first substrate 2 and the second substrate 5 may be provided with an align mark for displaying an alignment position. The process of aligning the positions of the first substrate 2 and the second substrate 5 may be performed by a bonding device. After the process of aligning the positions of the first substrate 2 and the second substrate 5 is performed, the process S51 of contacting the partition walls 3 with the adhesive portions 61 and contacting the electrophoretic medium 4 filled in the unipixel region defined by the partition walls 3 with the hardening portions 62 and the process S52 of bonding the first substrate 2 and the second substrate 5 to each other by hardening the adhesive portions 61 may be performed.

Referring to FIG. 2, FIG. 9 to FIG. 11, in the process S52 of hardening the adhesive portions 61, the adhesive portions 61 may be hardened using a first mask 300. The first mask 300 is used to form the partition walls 3 on the first substrate 2. This will be described in more detail as follows.

The process S1 (shown in FIG. 2) of forming the partition walls 3 on the first substrate 2 may include a process of patterning the partition walls layer 3a (shown in FIG. 11) formed on the first substrate 2 using the first mask 300. The patterning process may performed by a photolithography process based on the first mask 300. The first mask 300 includes a plurality of opening parts 310 and a plurality of shielding parts 320. The photolithography process may be performed in a state that the opening parts 310 of the first mask 300 are arranged above the portions where the partition walls 3 will be formed, and the shielding parts 320 of the first mask 300 are arranged above the portions where the unipixel regions 31 (shown in FIG. 4) will be formed. In FIG. 11, portions marked with dotted lines in the partition walls layer 3a denote those where the partition walls 3 and the unipixel regions 31 (shown in FIG. 4) will be formed. The opening parts 310 of the first mask 300 are formed in a location and shape corresponding to the partition walls 3. The shielding parts 320 of the first mask 300 are formed in a location and shape corresponding to the unipixel regions 31 (shown in FIG. 4). In this case, the patterning process is performed using a negative PR (photoresist).

The process S52 of hardening the adhesive portions 61 is performed using the first mask 300. The first mask 300 is arranged between the second substrate 5 and a hardening unit 200. This process may be performed in such a manner that the bonding device moves the first mask 300. The hardening unit 200 emits hardening light for hardening the sealant constituting the adhesive portions 61. The hardening unit 200 may be a UV lamp or other light source of different wavelength depending on the hardening materials used. The shielding parts of the first mask 300 are formed of a material that can shield the hardening light emitted from the hardening unit 200. The hardening light emitted from the hardening unit 200 partially passes through the opening parts 310 of the first mask 300 and then may be irradiated into the adhesive portions 61. As a result, the adhesive portions 61 are coupled to the partition walls 3 while being hardened, whereby the first substrate 2 and the second substrate 5 may be bonded to each other.

Meanwhile, the hardening light emitted from the hardening unit 200 is partially shielded by the shielding parts 320 of the first mask 300 and then may be prevented from being irradiated into the electrophoretic medium 4. Accordingly, performance of the electrophoretic medium 4 may be prevented from being deteriorated due to irradiation of the hardening light into the electrophoretic medium 4. As a result, in the method of manufacturing an electrophoretic display device described herein, the electrophoretic display device 1 having improved quality can be manufactured.

Also, since the first mask 300 may be used for the process S1 of forming the partition walls 3 and the process S52 of hardening the adhesive portions 61, the process cost for manufacturing the electrophoretic display device 1 may be reduced. Even though the first mask 300 is separately provided for each of the process S1 of forming the partition walls 3 and the process S52 of hardening the adhesive portions 61, since the first mask 300 may be manufactured for each of the processes by using one manufacturing facility, the process cost for manufacturing the first mask 300 can be reduced, whereby the process cost for manufacturing the electrophoretic display device 1 can be reduced.

Figure 9:
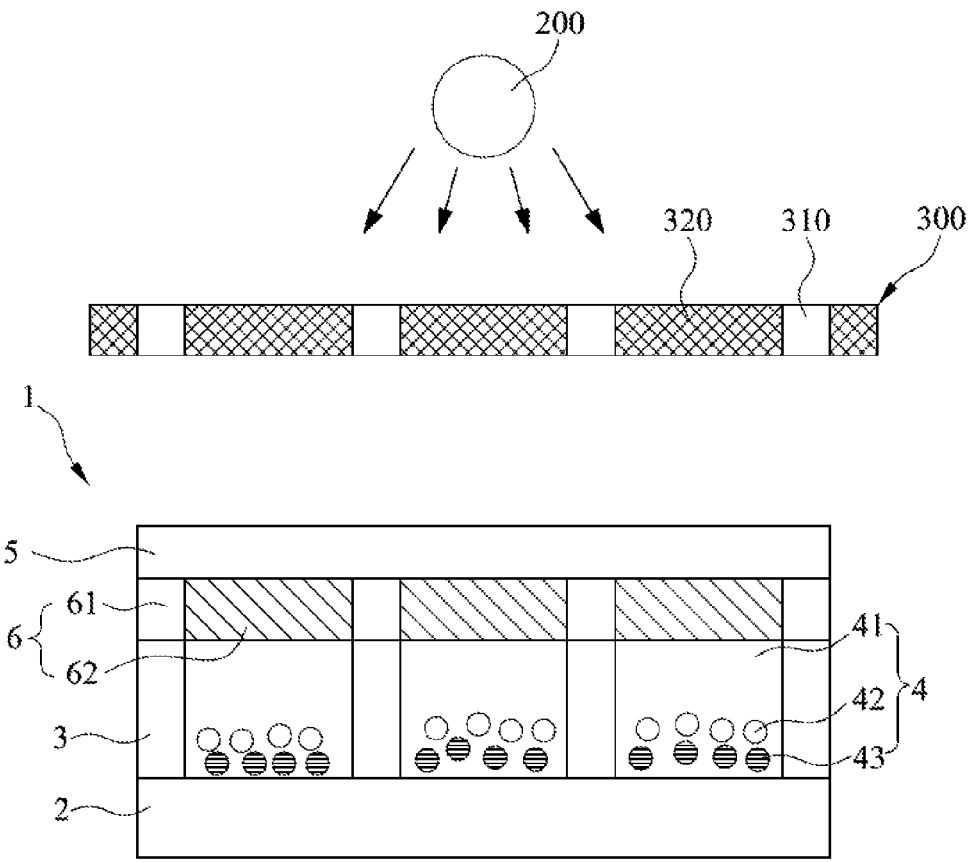
Figure 10:
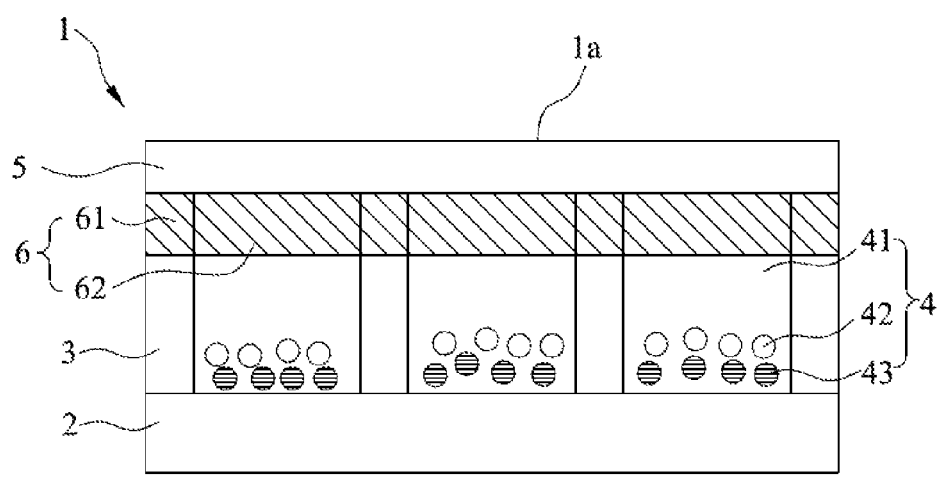
Figure 13:
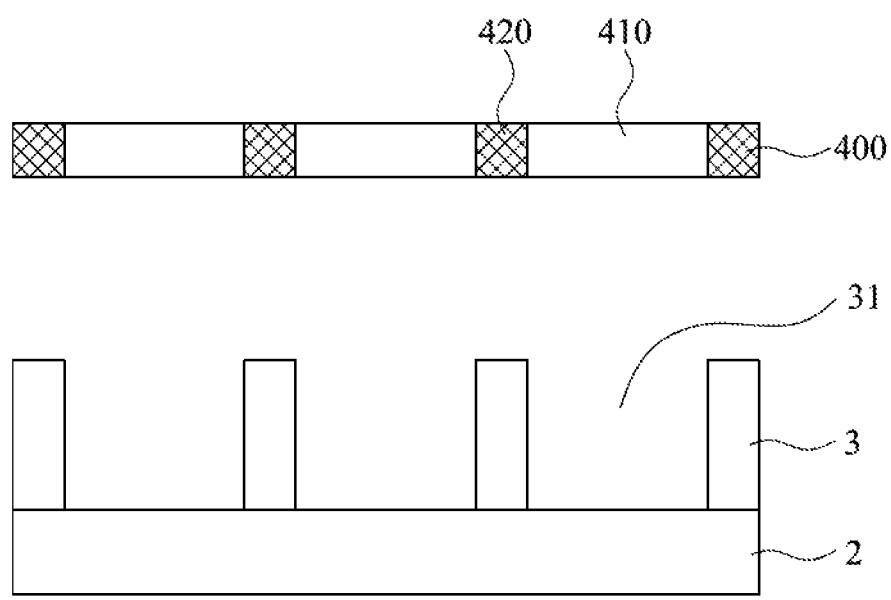

Referring to FIG. 2, FIG. 9 and FIG. 11, the process S52 of hardening the adhesive portions 61 using the first mask may include a process of arranging the first mask 300 and a process of irradiating hardening light to the adhesive portions 61.

The process of arranging the first mask 300 may be performed in such a manner that the first mask 300 is arranged between the second substrate 5 and the hardening unit 200. In this case, the opening parts 310 of the first mask 300 are arranged above the adhesive portions 61 and partition walls 3. The shielding parts 320 of the first mask 300 are arranged above the hardening portions 62 and the electrophoretic medium 4 filled in the unipixel region defined by the partition walls 3. Accordingly, the electrophoretic medium 4 filled in the unipixel region defined by the partition walls 3 is covered by the shielding parts 320 of the first mask 300, whereby the hardening light can be prevented from being irradiated into the electrophoretic medium 4.

The process of irradiation hardening light to the adhesive portions 61 may be performed in such a manner that the hardening light emitted from the hardening unit 200 partially passes through the opening parts 310 of the first mask 300 and then is irradiated into the adhesive portions 61. As a result, the adhesive portions 61 are coupled to the partition walls 3 while being hardened, whereby the first substrate 2 and the second substrate 5 may be bonded to each other. The hardening light emitted from the hardening unit 200 is partially shielded by the shielding parts 320 of the first mask 300, thereby failing to pass through the first mask 300. As a result, the hardening light may be prevented from being irradiated into the electrophoretic medium 4 filled in the unipixel region defined by the partition walls 3.

Referring to FIG. 2, FIG. 10 to FIG. 13, the process S4 of forming the adhesive portions 61 and the adhesive portions 62 includes a process of hardening the part of the adhesive layer 6 using a second mask 400. The second mask 400 is used to form the partition walls 3 on the first substrate 2. This will be described in more detail as follows.

The process S1 (shown in FIG. 2) of forming the partition walls 3 on the first substrate 2 may include a process of patterning the partition walls layer 3a (shown in FIG. 11) formed on the first substrate 2 using the second mask 400. The pattering process may be performed by the photolithography process based on the second mask 400. The second mask 400 includes a plurality of opening parts 410 and a plurality of shielding parts 420. The photolithography process may be performed in a state that the opening parts 410 of the second mask 400 are arranged above the portions where the unipixel regions 31 (shown in FIG. 13) will be formed and the shielding parts 420 of the second mask 400 are arranged above the portions where the partition walls 3 (shown in FIG. 13) will be formed. The opening parts 410 of the second mask 400 are formed in a location and shape corresponding to the unipixel regions 31. The shielding parts 420 of the second mask 400 are formed in a location and shape corresponding to the partition walls 3. In this case, the patterning process is performed using a positive PR.

The process of hardening the part of the adhesive layer 6 is performed using the second mask 400. The second mask 400 is arranged between the adhesive layer 6 and the hardening unit 200. The hardening unit 200 emits hardening light for hardening the sealant constituting the adhesive layer 6. The hardening unit 200 may be the UV lamp or another light source of different wavelength depending on the hardening materials used. The shielding parts 420 of the second mask 400 are formed of a material that can shield the hardening light emitted from the hardening unit 200. The hardening light emitted from the hardening unit 200 partially passes through the opening parts 410 of the second mask 400 and then may be irradiated into the second parts B of the adhesive layer 6. As a result, the second parts B of the adhesive layer 6 are hardened to form the hardening portions 62. Accordingly, when the first substrate 2 (shown in FIG. 10) and the second substrate 5 are bonded to each other, since the hardening portions 62 do not have adhesion, the hardening portions 62 may prevent the electrophoretic medium 4 (shown in FIG. 10) filled in the unipixel region defined by the partition walls 3 (shown in FIG. 10) from being attached thereto.

Meanwhile, the hardening light may partially be shielded by the shielding parts 420 of the second mask 400 and then may be prevented from being irradiated into the first parts A of the adhesive layer 6. As a result, the hardening light is not irradiated into the first parts A of the adhesive layer 6, whereby the first parts A may be formed as the adhesive portions 61. Accordingly, when the first substrate 2 and the second substrate 5 are bonded to each other, since the adhesive portions 61 have adhesion, the adhesive portions 61 may be hardened after contacting the partition walls 3, and then may be coupled with the partition walls 3.

Also, since the second mask 400 can be used for the process S1 of forming the partition walls 3 and the process of hardening the part of the adhesive layer 6, the process cost for manufacturing the electrophoretic display device 1 may be reduced. Even though the second mask 400 is separately provided in the process S1 of forming the partition walls 3 and the process of hardening the part of the adhesive layer 6, since the second mask 400 used for each of the process S1 of forming the partition walls 3 and the process of hardening the adhesive layer 6 can be manufactured using one manufacturing facility, the process cost for manufacturing the second mask 400 may be reduced, reducing the process cost for manufacturing the electrophoretic display device 1.

Referring to FIG. 2, FIG. 10 to FIG. 13, the process of hardening the part of the adhesive layer 6 using the second mask 400 may include a process of arranging the second mask 400 and a process of irradiating hardening light to the second parts B.

The process of arranging the second mask 400 may be performed in such a manner that the second mask 400 is arranged between the adhesive layer 6 and the hardening unit 200. This process may be performed in such a manner that at least one of the second mask 400 and the second substrate 5 moves to arrange the second mask 400 between the adhesive layer 6 and the hardening unit 200. At least one of the second mask 400 and the second substrate 5 may be moved by a mobile device. In this case, the opening parts 410 of the second mask 400 are arranged above the second parts B of the adhesive layer 6. The shielding parts 420 of the second mask 400 are arranged above the first parts A of the adhesive layer 6. Accordingly, the first parts A of the adhesive layer 6 are covered by the shielding parts 420 of the second mask 400, whereby the hardening light emitted from the hardening unit 200 can be prevented from being irradiated into the first parts A of the adhesive layer 6.

The process of irradiating hardening light to the second parts B may be performed in such a manner that the hardening light emitted from the hardening unit 200 partially passes through the opening parts 410 of the second mask 400 and then is irradiated into the second parts B of the adhesive layer 6. As a result, the second parts B of the adhesive layer 6 may be hardened to form the hardening portions 62. Accordingly, when the first substrate 2 and the second substrate 5 are bonded to each other, since the hardening portions 62 do not have adhesion, the hardening portions 62 may prevent the electrophoretic medium 4 filled in the unipixel region defined by the partition walls 3 from being attached thereto.

Meanwhile, the hardening light emitted from the hardening unit 200 may partially be shielded by the shielding parts 420 of the second mask 400, thereby failing to pass through the second mask 400. As a result, the hardening light is not irradiated into the first parts A of the adhesive layer 6, whereby the first parts A may be formed as the adhesive portions 61. Accordingly, when the first substrate 2 and the second substrate 5 are bonded to each other, since the adhesive portions 61 have adhesion, the adhesive portions 61 may be hardened after contacting the partition walls 3, and then may be coupled with the partition walls 3.

According to the present invention, the following advantages may be obtained.

Since the process cost for manufacturing the electrophoretic display device can be reduced, the manufacturing cost of the electrophoretic display device may be be reduced.

Since the bonding process is performed after the adhesive layer is partially hardened, the electrophoretic medium may be be prevented from being attached to the adhesive layer, whereby the electrophoretic display device having improved quality can be manufactured.

Since the hardening light for hardening the adhesive layer is prevented from being irradiated to the electrophoretic medium when the bonding process is performed, performance of the electrophoretic medium may be prevented from being deteriorated, whereby the electrophoretic display device having improved quality can be manufactured.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of manufacturing an electrophoretic display device, the method comprising the steps of:
    forming a plurality of partition walls defining unipixel regions on a first substrate;
    filling an electrophoretic medium in the unipixel regions;
    forming an adhesive layer on a second substrate to bond the first substrate to the second substrate;
    forming (i) a plurality of adhesive portions for contact with the partition walls and (ii) a plurality of hardening portions for sealing the unipixel region filled with the electrophoretic medium by hardening a part of the adhesive layer; and
    bonding the first substrate and the second substrate to each other using a first mask,
    wherein the step of forming a plurality of partition walls comprises patterning a partition walls layer on the first substrate using the first mask,
    wherein the step of bonding the first substrate and the second substrate to each other comprises:
    arranging shielding parts of the first mask to cover the electrophoretic medium filled in the unipixel regions; and
    irradiating hardening light to the adhesive portions through opening parts of the first mask.

2. The method of claim 1, wherein the step of bonding the first substrate and the second substrate to each other comprises:
    contacting the partition walls with the adhesive portions and contacting the electrophoretic medium filled in the unipixel region with the hardening portions; and
    hardening the adhesive portions to bond the first substrate and the second substrate to each other.

3. The method of claim 1, wherein the step of bonding the first substrate and the second substrate to each other comprises:
    aligning the first substrate and the second substrate to correspond to the partition walls and the adhesive portions;
    contacting the partition walls with the adhesive portions; and
    hardening the adhesive portions to bond the first substrate and the second substrate to each other.

4. The method of claim 1, wherein the step of forming the adhesive portions and the hardening portions comprises hardening the part of the adhesive layer using a second mask.

5. The method of claim 4, wherein the step of hardening the part of the adhesive layer using the second mark comprises:
    arranging shielding parts of the second mask to cover first parts of the adhesive layer; and
    irradiating hardening light to second parts of the adhesive layer through opening parts of the second mask, wherein the first parts are formed as the adhesive portions and the second parts are formed as the hardening portions.

* * * * *